(12) United States Patent  (10) Patent No.: US 9,087,033 B2
Manber et al.  (45) Date of Patent: Jul. 21, 2015

(54) AUTOMATED ANNOTATION OF A RESOURCE ON A COMPUTER NETWORK USING A NETWORK ADDRESS OF THE RESOURCE

(71) Applicant: Ophivain Applications NY L.L.C., Dover, DE (US)

(72) Inventors: Udi Manber, Palo Alto, CA (US); Jonathan Leblang, Palo Alto, CA (US); Colin Saunders, Palo Alto, CA (US); Matthew Amacker, Palo Alto, CA (US)

(73) Assignee: Ophivain Applications NY L.L.C., Dover, DE (US)

( * ) Notice: Subject to any disclaimer, the term of this patent is extended or adjusted under 35 U.S.C. 154(b) by 0 days.

(21) Appl. No.: 13/678,201

(22) Filed: Nov. 15, 2012

(65) Prior Publication Data

US 2013/0080872 A1 Mar. 28, 2013

Related U.S. Application Data

(60) Division of application No. 11/096,973, filed on Mar. 31, 2005, now abandoned, which is a continuation of application No. 10/793,695, filed on Mar. 4, 2004, now Pat. No. 8,069,194.

(51) Int. Cl.
G06F 17/00 (2006.01)
G06F 17/24 (2006.01)
G06F 17/30 (2006.01)

(52) U.S. Cl.
CPC ........ *G06F 17/241* (2013.01); *G06F 17/30011* (2013.01); *Y10S 707/959* (2013.01)

(58) Field of Classification Search
CPC ..................................................... G06F 17/241

USPC .................. 715/230, 232, 233, 751; 707/959; 709/751, 228

See application file for complete search history.

(56) References Cited

U.S. PATENT DOCUMENTS 5,309,359 A    5/1994   Katz et al.
5,596,700 A *  1/1997   Darnell et al. ................. 715/205
6,081,829 A    6/2000   Sidana (Continued)

OTHER PUBLICATIONS

USPTO; Final Office Action dated Feb. 16, 2011 in U.S. Appl. No. 11/096,973.

(Continued)

*Primary Examiner* — Cheyne D Ly
(74) *Attorney, Agent, or Firm* — Brundidge & Stanger, P.C.

(57) ABSTRACT

A user provides an annotation, such as text or graphics, in relation to a resource available on a computer network. The annotation is automatically stored and/or retrieved without requiring separate action from the user to accomplish the storage or retrieval. An annotation interface may receive the annotation from the user. The annotation is then stored in association with the user and the network address of the resource. The user's annotation may be later retrieved and displayed to the user based on the network address of the resource. In one specific embodiment, a browser toolbar receives and displays user annotations associated with Web sites or Web pages to which the user has navigated. Preferably, the annotation interface remains available to the user throughout the time in which the resource is provided. Further controls may enable the user to make an annotation publicly available to others, and to receive annotations from others.

19 Claims, 11 Drawing Sheets

(56) References Cited

U.S. PATENT DOCUMENTS

| | | |
|---|---|---|
| 6,289,362 B1 | 9/2001 | Van Der Meer |
| 6,356,934 B1 | 3/2002 | Delph |
| 6,484,156 B1 | 11/2002 | Gupta et al. |
| 6,507,726 B1 | 1/2003 | Atkinson et al. |
| 6,671,714 B1 | 12/2003 | Weyer et al. |
| 6,687,877 B1 | 2/2004 | Sastry |
| 6,697,838 B1 | 2/2004 | Jakobson |
| 6,826,595 B1 | 11/2004 | Barbash et al. |
| 6,876,977 B1 | 4/2005 | Marks |
| 6,917,965 B2 | 7/2005 | Gupta et al. |
| 7,185,238 B2 | 2/2007 | Wedel et al. |
| 7,822,735 B2 | 10/2010 | Suda et al. |
| 2001/0016872 A1 | 8/2001 | Kusuda |
| 2001/0037365 A1 | 11/2001 | Montague et al. |
| 2001/0042098 A1 | 11/2001 | Gupta et al. |
| 2002/0023108 A1 | 2/2002 | Daswani et al. |
| 2002/0035563 A1 | 3/2002 | Suda et al. |
| 2002/0065842 A1 | 5/2002 | Takagi et al. |
| 2002/0116494 A1 | 8/2002 | Kocol |
| 2002/0133628 A1 | 9/2002 | Asplund et al. |
| 2002/0147796 A1 | 10/2002 | Chung |
| 2002/0152216 A1 | 10/2002 | Bouthors |
| 2002/0161801 A1 | 10/2002 | Hind et al. |
| 2003/0081000 A1 | 5/2003 | Watanabe et al. |
| 2003/0196164 A1 | 10/2003 | Gupta et al. |
| 2004/0003351 A1 | 1/2004 | Sommerer et al. |
| 2004/0138946 A1 | 7/2004 | Stolze |
| 2004/0260717 A1* | 12/2004 | Albornoz et al. ............. 707/102 |
| 2005/0091578 A1 | 4/2005 | Madan et al. |
| 2005/0165726 A1 | 7/2005 | Kawell, Jr. et al. |
| 2005/0210412 A1 | 9/2005 | Matthews |
| 2005/0216457 A1 | 9/2005 | Walther et al. |
| 2006/0031288 A1 | 2/2006 | Ter Horst et al. |

OTHER PUBLICATIONS

Edwards et al., "Reusing Internet Explorer and the WebBrowser Control: An Array of Options," technical information on Microsoft Corporation's Web site, <http://msdn.microsoft.com/en-us/library/bb250464(VS.85).aspx>, Jul. 30, 1998.
"Programming and Reusing the Browser", technical information on Microsoft Corporation's Web site, <http://msdn.microsoft.com/en-us/library/aa752038(v=VS.85).aspx>, 2006.
"Web Accessories", technical information on Microsoft Corporation's Web site, <http://msdn.microsoft.com/en-us/library/aa744101(VS.85).aspx>, 2006.
Roscheisen et al., CHI Companion 95, Denver, Colorado USA, 1995, pp. 328-329.
USPTO; Advisory Action dated May 5, 2011 in U.S. Appl. No. 11/096,973.
USPTO; Office Action dated Jun. 24, 2011 in U.S. Appl. No. 11/096,973.
"Non Final Office Action", U.S. Appl. No. 11/096,973, (Sep. 13, 2010), 16 pages.
Brush, A., Annotating Digital Documents for Asynchronous Collaboration, University of Washington: Department of Computer Science and Engineering, Technical Report, Sep. 2002, pp. 1-119.
"Advisory Action", U.S. Appl. No. 11/096,973, (Feb. 8, 2010), 3 pages.
"Non-Final Office Action," U.S. Appl. No. 11/096,973, (Apr. 1, 2010), 15 pages.
Kahan et al., Computer Networks, vol. 39, Issue 5, Aug. 5, 2002, pp. 589-608.
"Final Office Action", U.S. Appl. No. 11/096,973, (Nov. 27, 2009), 14 pages.
"Non Final Office Action," U.S. Appl. No. 11/096,973, (Mar. 17, 2009), 34 pages.
"Final Office Action," U.S. Appl. No. 11/096,973, (Jul. 10, 2008), 11 pages.
"Non Final Office Action," U.S. Appl. No. 11/096,973, (Feb. 6, 2008), 10 pages.
"Final Office Action," U.S. Appl. No. 11/096,973, (May 31, 2007), 11 pages.
"Non Final Office Action," U.S. Appl. No. 11/096,973, (Dec. 12, 2006), 9 pages.
"Non Final Office Action," U.S. Appl. No. 11/096,973, (Aug. 23, 2006), 15 pages.
Hirotsu et al., IEEE TENCON, 1999, pp. 356-359.
Chiu et al., WWW10, ACMm, May 2-5, 2005, Hong Kong, pp. 140-149.
"Programming and Reusing the Browser," technical information on Microsoft Corporation's Web site, <http://msdn.microsoft.com/library/default.asp?url=/workshop/browser/progr_browser_node_entry.asp>, 2006.
Edwards, M., and S. Roberts, "Reusing Internet Explorer and the WebBrowser Control: An Array of Options," technical information on Microsoft Corporation's Web site, <http://msdn.microsoft.com/library/default.asp?url=/library/en-us/dnwebgen/html/reusebovw.asp>, Jul. 30, 1998.
"Web Accessories," technical information on Microsoft Corporation's Web site, <http://msdn.microsoft.com/workshop/browser/accessory/overview/overview.asp>, 2006.
Kemp, A., Persistent Client State HTTP Cookies, http://ils.unc.edu/~kempa/cookies/icookie.html, pp. 1-11, 1998.
Au et al., Netscape Communicator's Collapsible Toolbars, CHI 98 Los Angeles, CA USA, pp. 81-86, Apr. 18-23, 1998.
USPTO, Notice of Allowance dated Aug. 22, 2011 in U.S. Appl. No. 10/793,695.
USPTO, Final Office Action dated Jan. 19, 2011 in U.S. Appl. No. 10/793,695.
USPTO, Advisory Action dated Mar. 28, 2011 in U.S. Appl. No. 10/793,695.
Advisory Action, U.S. Appl. No. 10/793,695, (Jun. 30, 2010), 3 pages.
Non Final Office Action, U.S. Appl. No. 10/793,695, (Jul. 27, 2010), 22 pages.
Final Office Action, U.S. Appl. No. 10/793,695, (Apr. 15, 2010), 14 pages.
Final Office Action, U.S. Appl. No. 10/793,695, (Apr. 15, 2009), 16 pages.
Non Final Office Action, U.S. Appl. No. 10/793,695, (Jul. 17, 2008), 14 pages.
Non Final Office Action, U.S. Appl. No. 10/793,695, Feb. 6, 2008), 15 pages.
Advisory Action, U.S. Appl. No. 10/793,695, (Apr. 16, 2007), 3 pages.
Final Office Action, U.S. Appl. No. 10/793,695, (Feb. 9, 2007), 15 pages.
Non Final Office Action, U.S. Appl. No. 10/793,695, (Aug. 23, 2006), 12 pages.
Non Final Office Action, U.S. Appl. No. 10/793,695, (Sep. 29, 2009), 14 pages.

* cited by examiner

AUTOMATED ANNOTATION OF A RESOURCE ON A COMPUTER NETWORK USING A NETWORK ADDRESS OF THE RESOURCE

CROSS REFERENCE TO RELATED APPLICATIONS

This application is a divisional of U.S. patent application Ser. No. 11/096,973, filed on Mar. 31, 2005, which is a continuation of U.S. patent application Ser. No. 10/793,695, titled AUTOMATED ANNOTATION OF A RESOURCE ON A COMPUTER NETWORK USING A NETWORK ADDRESS OF THE RESOURCE, filed Mar. 4, 2004, now U.S. Pat. No. 8,069,194, issued on Nov. 29, 2011, priority from the filing date of which is hereby claimed under 35 U.S.C. §120.

FIELD OF THE INVENTION

This invention relates to the use of resources on a computer network, and more particularly to storage and retrieval of annotations associated with resources on a computer network.

BACKGROUND OF THE INVENTION

Computer networks are well known for providing communication between different computing systems to enable one system to share a resource with another system. For example, a server system may have a resource, such as a document written in a markup language (e.g., html, xml etc.), a data file, a software process, or a hardware device that can be accessed by a client system over a computer network using a network address that identifies the desired resource in the computer network. A client system can request the resource from the server system using the network address of the resource. Computer networks range from local area networks to wide area networks to global networks including the Internet. The Internet, in particular, enables computing systems to provide a wide range of computer resources to users.

In the realm of the World Wide Web ("the Web"), typical computer users access Web pages by instructing a browser operating at their local client computer to transmit a request for a Web page using a uniform resource locator ("URL"). Domain name servers operating on the Internet help direct the Web page request to one or more server computers that correspond to the network domain identified in the URL. When the Web page request is received by the server computers, the markup code that embodies the Web page is transmitted to the client computer of requesting user. The user's browser receives the markup code and displays the Web page to the user.

As part of the process of receiving and using resources, such as Web pages, on computer networks, users may have thoughts, form impressions, or think of additional information they would like to store in connection with the resources being used. For example, a user visiting a merchant Web site may wish to note that the merchant has better prices or better shipping terms than other merchant Web sites. As another example, a user reading a document on a computer network, such as a product manual, may have comments on the instructions provided in the manual and wish to preserve those comments for later retrieval when again accessing the manual via the computer network. Because of the high rate at which users may receive and use resources on a computer network, it is difficult and cumbersome for users to store these thoughts, opinions, and information for later retrieval. Users may bookmark a Web site, but bookmarking does not preserve the specific thoughts, opinions, and information the user may have had about the Web site. Bookmarks are useful only for quickly returning to a particular Web site of interest. Alternatively, users may hand write their thoughts, opinions, and information on paper, but the user must remember that these annotations exist and where these annotations are located.

What is needed is a system and method that facilitates the storage and retrieval of annotations that a user may have in regard to a computer resource. In view of the problems and shortcomings noted above, it is apparent that systems and methods that help users store and retrieve annotations associated with computer resources will have significant utility, particularly if the systems and methods require minimal or no effort on the part of the user.

SUMMARY OF THE INVENTION

Disclosed herein are systems and methods that enable a user to annotate a computer resource and automatically store and/or retrieve the annotation without requiring separate action from the user to accomplish the storage or retrieval. In a typical embodiment, a user annotates a resource on a computer network by providing input, such as text or graphics, in association with the resource. Specific embodiments disclosed herein use the network address that identifies the resource and the identity of the user to store the annotation for later retrieval. Automated retrieval of annotations is particularly useful when the user returns to access a previously-annotated resource using the network address of the resource.

In one aspect, a method for annotating a resource on a computer network includes receiving a network address for the resource on the computer network. The method further includes providing an annotation interface to a user. The annotation interface is configured to receive an annotation from the user in association with the resource without requiring the user to conclude the annotation with a separate action to have the annotation stored. The annotation is stored in association with the user's identity and the network address of the resource. In circumstances where the user accesses the resource at a later time, the user's annotation may be automatically retrieved and displayed to the user based on the network address of the resource.

Annotations received from the user may be in the form of text or graphics, and may include a link to another resource on the computer network. Preferably, the annotation interface remains available to the user throughout the time in which the resource is provided to the user.

Annotations received from the user may be stored in an annotation database. Moreover, previously-stored annotations displayed to the user may be modified by the user. The modified annotations are then stored in the annotation database in association with the user and the network address of the resource.

One exemplary form of an annotation interface is a toolbar that appears on a display to a user. The toolbar may include an annotation field configured to receive an annotation from the user. If the annotation includes text or graphics that occupy more space than can be displayed in the annotation field, a scroll bar control may be provided to the annotation field. The toolbar may also provide one or more controls that allow the user to expand the annotation field. Another control may be provided for opening a new annotation field separate from the toolbar, such as a separate window, for displaying an annotation to the user and receiving new annotations or modifications from the user. In yet other embodiments, the display size of the toolbar may be adjusted according to the size of the annotation in the annotation field, up to a maximum display size, if such is defined.

One or more controls may be provided to enable the user to make an annotation publicly available to others. A further control may enable a user to receive public annotations from others that were previously received in association with the resource.

A user annotation of a resource may be stored in association with all or some of the network address that identifies the resource. For example, a resource may be one of a plurality of resources that share a common base network address, such as a top level domain. In some embodiments, an annotation may be stored in association with the user and the base network address of the resource, rather than the full network address that identifies the specific resource. Computer processes are provided for analyzing the network address of the resource to identify the base network address of the resource.

An annotation may be automatically stored when the resource is no longer being provided to the user. For example, a user-entered annotation associated with a Web page may be automatically stored when the user navigates to a new Web page at a different Web address. An annotation may also be automatically stored at the time the annotation is being received from the user.

Because annotations are stored in association with the user, a report may be provided to the user that identifies some or all of the resources that the user has annotated. The report may be configured such that the user can modify annotations in the report by changing or deleting the annotation. The modified annotation is then stored (or annotation is removed, in the case of deletion). The modifications or deletions may be separately recorded so that the user can view a history of annotations, if desired.

In another aspect, a computer system is described herein for annotating a resource on a computer network. The computer system may include an annotation database and an annotation server in communication with the annotation database. The annotation server is configured to receive a network address of a resource on the computer network, receive an annotation of the resource from a user, and store the annotation in the annotation database in association with the user and the network address of the resource.

The annotation server may receive the network address of the resource from either the user or from another source on the computer network, such as the resource server that is providing the resource to the user. A user may request a resource by transmitting the network address of the resource to the resource server, and at the same or subsequent time, transmit the network address to the annotation server. In such case, the annotation server may receive the network address of the resource at approximately the same time that the network address is received by the resource server. User annotations received thereafter are stored in the annotation database in association with the identity of the user and the network address of the resource.

In yet another aspect, a computer-readable medium may be provided with contents that cause a computing system to operate in accordance with the methods and systems described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
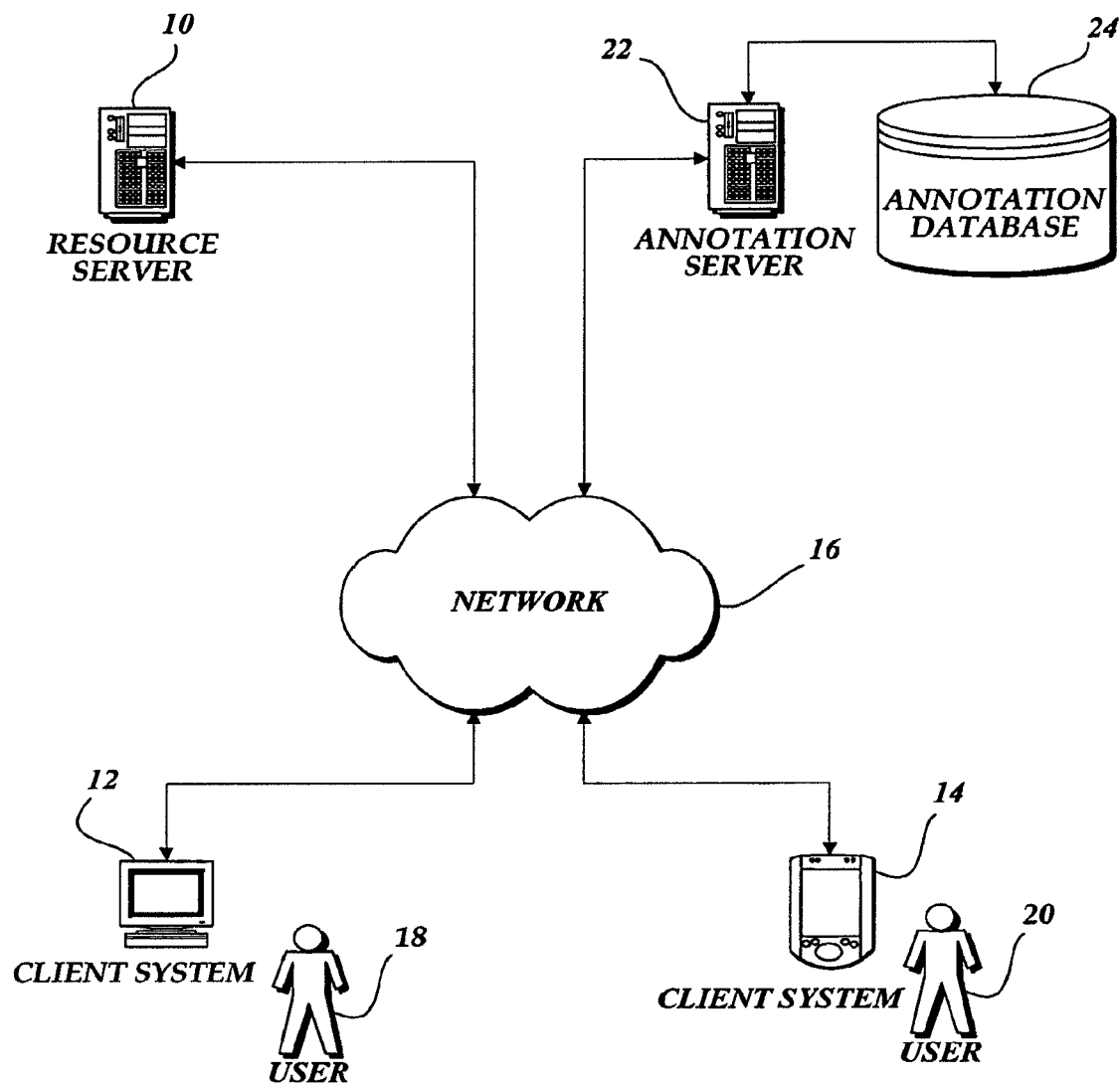
FIG. 1 is a pictorial diagram showing an exemplary environment in which embodiments of the invention may be implemented.

FIG. 1 provides an exemplary overview of one computing environment in which embodiments of the invention may be implemented. The depicted environment includes a resource server 10 and one or more client systems 12, 14 communicatively connected by a network 16. The client system 12 is shown associated with a user 18. Similarly, the client system 14 is shown associated with a user 20.

Further depicted in FIG. 1 is an annotation server 22 that is communicatively connected by the network 16 to the client systems 12, 14 and to the resource server 10. The annotation server 22 is also shown with a direct communication link to an annotation database 24.

As will be described below in regard to exemplary embodiments shown herein, the resource server 10 is configured to provide one or more resources to the users 18, 20 that are operating the client systems 12, 14, respectively. The resources at the resource server 10 are addressable by a network address that identifies the particular resources in the network 16. Such resources may include, but are not limited to, Web pages identified by a network address in the form of a Uniform Resource Locator ("URL"), a document that may be identified and obtained by a File Transfer Protocol ("FTP") command, a file located on a local or remote computing system, a software process or hardware device that is addressable by a network address, etc.

It should be understood that the term "network address" used in connection with different embodiments of the invention may refer to any computer address that identifies a resource on a computing system. The resource may be located on a local computing system and thus identified by a local computer address (e.g., drive identifier and file/device identifier), or the resource may be located on a remote computing system and thus identified by a remote computer address (e.g., network domain identifier and file/device identifier).

A user, such as user 18, may operate a client system, such as client system 12, to request a resource from the resource server 10 via the network 16. The network 16 may be a Local Area Network ("LAN"), a larger network such as a Wide Area Network ("WAN"), or a collection of networks, such as the Internet. Protocols for network communication, such as TCP/IP, are well known to those skilled in the art of computer networks. As further described herein, the user 18 may also operate the client system 12 to communicate annotations of a resource to the annotation server 22 for storage in the annotation database 24. Previously-stored annotations stored in the annotation database 24 may be later retrieved and displayed to the user, particularly when the user is again accessing the resource. As will be appreciated by those skilled in the art and others, FIG. 1 provides a simplified example of just one suitable computing environment for implementing embodiments of the present invention, and does not limit the invention thereto. In some embodiments, the computing systems shown, e.g., the resource server 10, the client system 12, and/or the annotation server 22, may be implemented in a single computing system and thus not require network protocols for communication between the combined systems.

When software formed in accordance with the invention is implemented in one or more computer systems, for example of the type illustrated in FIG. 1, the computer systems provide a way for users to access computer resources, compose and record annotations thereto, and retrieve previously-stored annotations of resources. Allowing a user to annotate a computer resource enhances the user's computing experience by preserving the thoughts, opinions, and information the user may have in regard to the resource.

Figure 2:
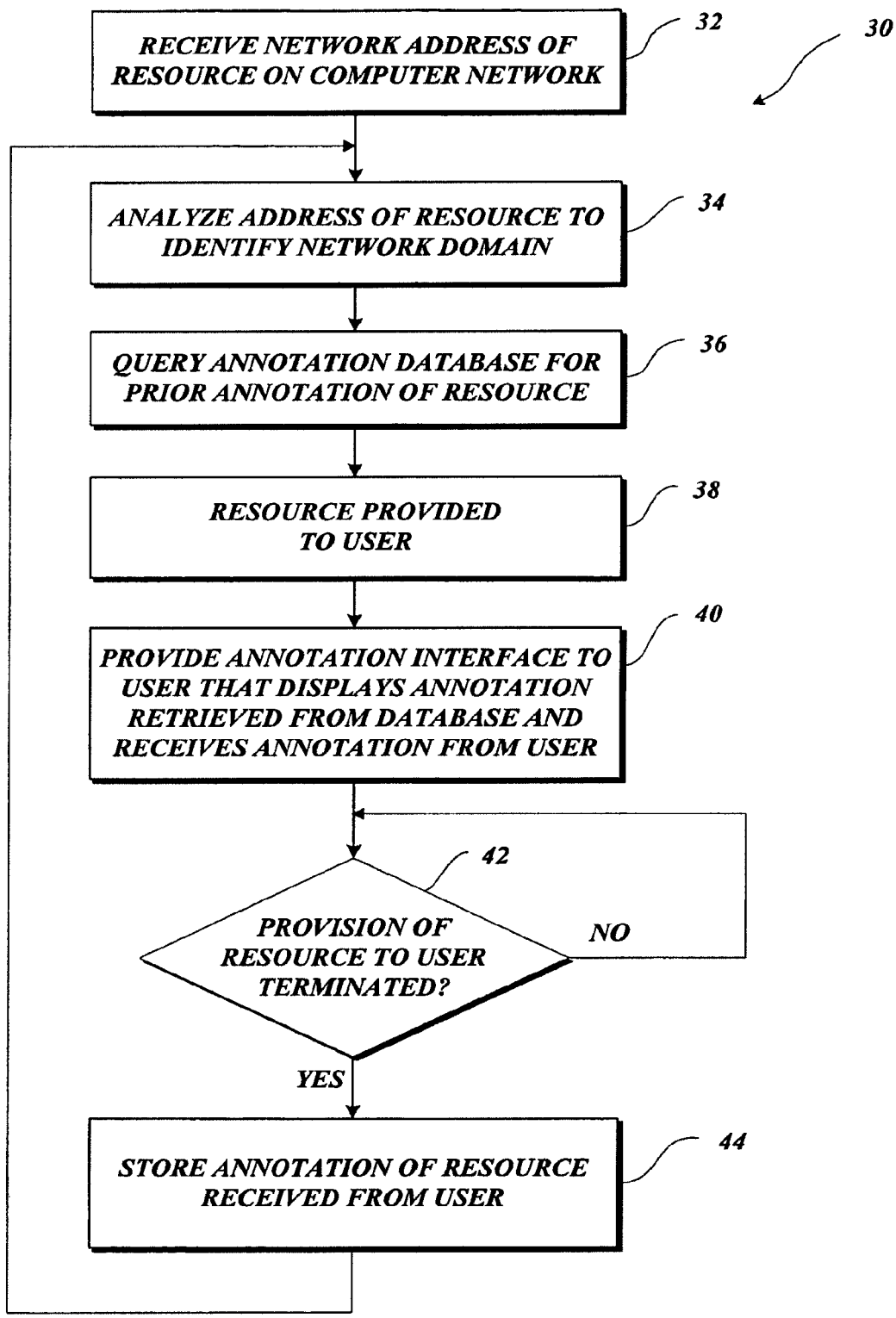
FIG. 2 is a flow diagram of one exemplary method for storage and retrieval of user annotations provided in association with a resource on a computer network.

Prior to discussing exemplary computer architectures for implementing a client system, resource server, and annotation server as depicted in FIG. 1, a discussion of one exemplary method for implementing an embodiment of the invention is provided. FIG. 2 is a flow diagram of one exemplary method 30 for storage and retrieval of user annotations provided in regard to a computer resource. The method 30 begins at block 32 by receiving a network address of a resource on a computer network. In some embodiments, the network address may be received directly from the client system of the user (or a proxy server supporting the client system). In the context of FIG. 1, a client system 12 may request a resource from the resource server 10 by transmitting the network address of the resource to the resource server 10. At the same or subsequent time, the client system 12 may transmit the network address to the annotation server 22. In other embodiments, the client system 12 may communicate only with the resource server 10, and along with providing the requested resource to the user, the resource server 10 may communicate the network address of the requested resource to the annotation server 22 with an identification of the user receiving the resource.

In any event, once the network address of the resource is received, e.g., by the annotation sever 22, one or more computer processes operating at the annotation server 22 may analyze the address of the resource to identify the network domain of the resource. As will be understood from the description herein, an annotation of the resource may be stored in connection with all or some of the network address of the resource. In the embodiment illustrated in FIG. 2, it is assumed that a user's annotation of a resource is stored in association with the portion of the network address that identifies the network domain of the resource. In other embodiments, a different portion or all of the network address may be used for storing the annotation. Furthermore, it will be appreciated that computer processes operating at the annotation server 22, such as the network address analysis noted above, may operate instead at the client system 12.

A requested resource may be a document stored in Adobe® portable document format ("PDF"), for example. The network address of the PDF document may be a URL to a Web site that contains the document. In the examples shown in FIGS. 4A and 4B, as well as FIGS. 5 through 7, the client system 12 (or a proxy server operating with the client system 12) communicates the URL "www.cordlessphone.com/product_manual.pdf" to a resource server at "www.cordlessphone.com" using hypertext transfer protocol. The computer process referenced in block 34 of FIG. 2 parses the URL to identify the network domain, which in this example is "www.cordlessphone.com". The network domain could also be further reduced to "cordlessphone.com" so that annotations of "www1.cordlessphone.com", "www2.cordlessphone.com", etc., are all aggregated under the same network domain. In other embodiments, the entire network address (e.g., entire URL or other computer address) may be used for storing annotations of the resource.

Returning to FIG. 2, once the network domain of the resource is identified, the network domain is used to query an annotation database (block 36) to determine whether the user has previously stored an annotation in association with the network domain of the resource. If an annotation for the resource exists in the annotation database, the annotation is retrieved for display to the user.

At block 38, the resource is provided to the user. At the same or subsequent time (in this example), the user is provided an annotation interface at block 40 that displays the annotation (if any) retrieved from the annotation database at block 36. As will be depicted and described hereafter, the annotation interface may (in one embodiment) be in the form of a toolbar that appears on a display to the user. The toolbar may include an annotation field that displays the annotation to the user. The annotation field is also preferably configured to receive annotations from the user, either as a modification of a previously-entered annotation, or an entry of a new annotation in the annotation field.

At decision block 42, the method 30 determines whether provision of the resource to the user has terminated. For example, in the case of providing a Web page resource, when the user navigates to a new Web page having a different network address (URL), the prior Web page is no longer provided to the user and is replaced by the new Web page. In other cases, the user may close, terminate, or otherwise disable the application (e.g., Web browser) using the resource. In any event, as long as the resource is continuing to be provided to the user, the method 30 continues to repeat the query in decision block 42.

Once the provision of the resource to the user has terminated, the method 30 proceeds to store the user's annotation of the resource (which may be entered in the annotation field noted above). The annotation is stored in the annotation database in association with the user and the network address of the resource. In the case where the user terminated provision of the resource in favor of accessing a new resource (e.g., navigating to a new Web page), the method 30 returns to block 34 to analyze the network address of the newly requested resource to identify the network domain of the resource. The method 30 then repeats the actions following block 34 for the newly-requested resource. Where a previously-stored annotation was retrieved and modified by the user, the modifications may be stored as such so that, if desired, the user can retrieve and view a history of the annotations and modifications entered over time.

It should be understood that implementations of the invention are not limited to the method as shown in FIG. 2. Other methods may include additional actions or eliminate some of the actions shown in FIG. 2. For example, as noted above, embodiments of the invention that use the full network address of the resource instead of just the network domain may eliminate the analysis performed in block 34. In some embodiments, a user may annotate a resource without necessarily receiving the resource or may receive the resource from someone else. In that regard, provision of the resource in block 38 may be eliminated.

In other embodiments, annotations received from a user may be stored at the same time while the annotations are being received from the user. In such case, the query performed in decision block 42 to determine whether the provision of the resource has been terminated is no longer applicable. Storage of the annotation has already occurred. In yet other embodiments, the annotation may be stored according to a predetermined schedule, such as every 5 seconds (for example), especially when modifications or new annotations are being entered, with perhaps a final automatic storage occurring when the resource is no longer being provided.

The actions shown in FIG. 2 may also be performed in a different order than shown. For example, provision of the resource to the user in block 38 may be performed before the annotation database is queried in block 36. As another example, the annotation interface provided to the user in block 40 may be provided before the network address of the resource is received in block 32. The method depicted in FIG. 2 provides just one example of the manner in which an embodiment of the invention may be implemented.

Figure 3A:
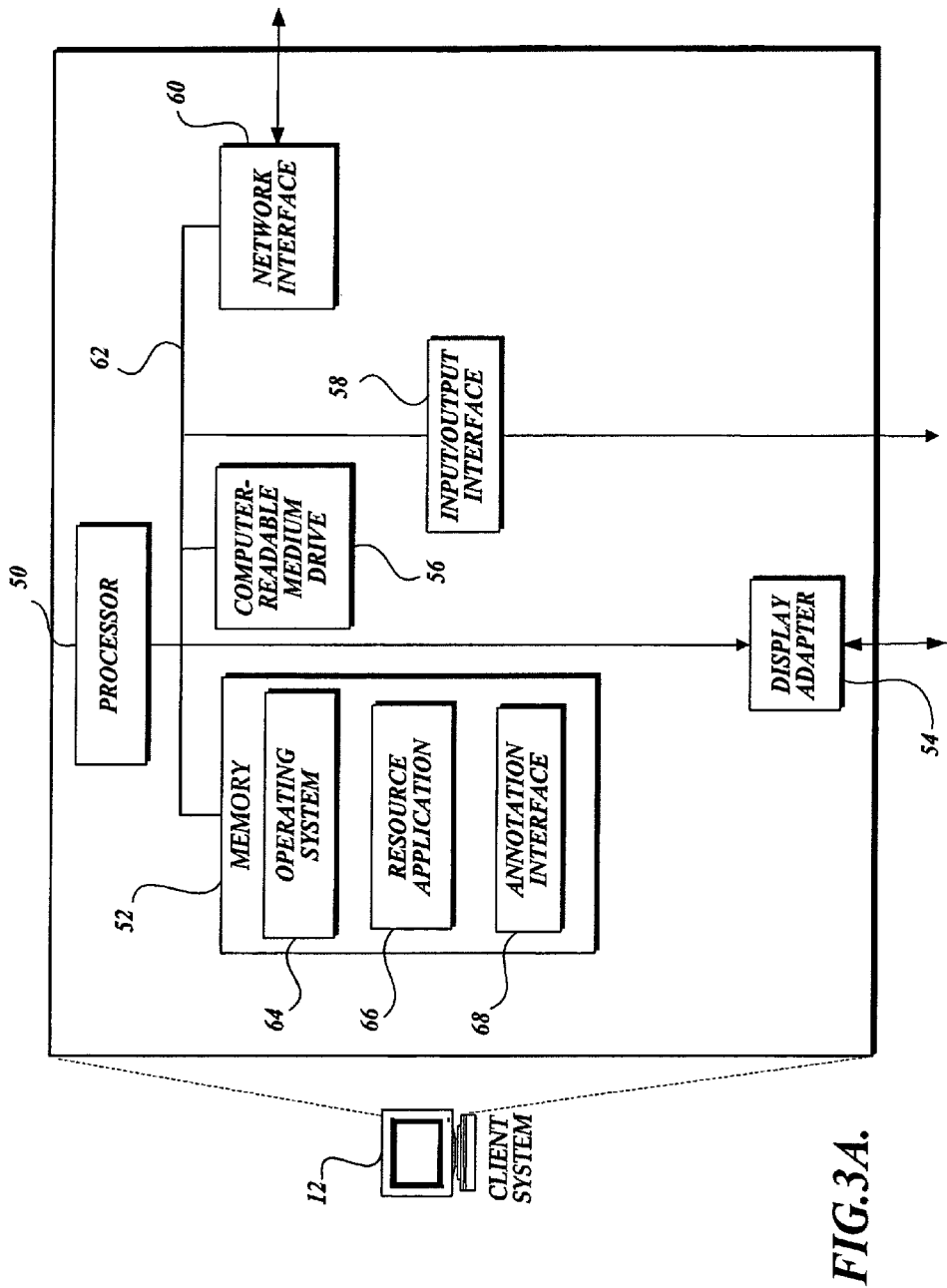
FIG. 3A is a block diagram showing some of the components that may be incorporated in a client system as depicted in FIG. 1.
Figure 3B:
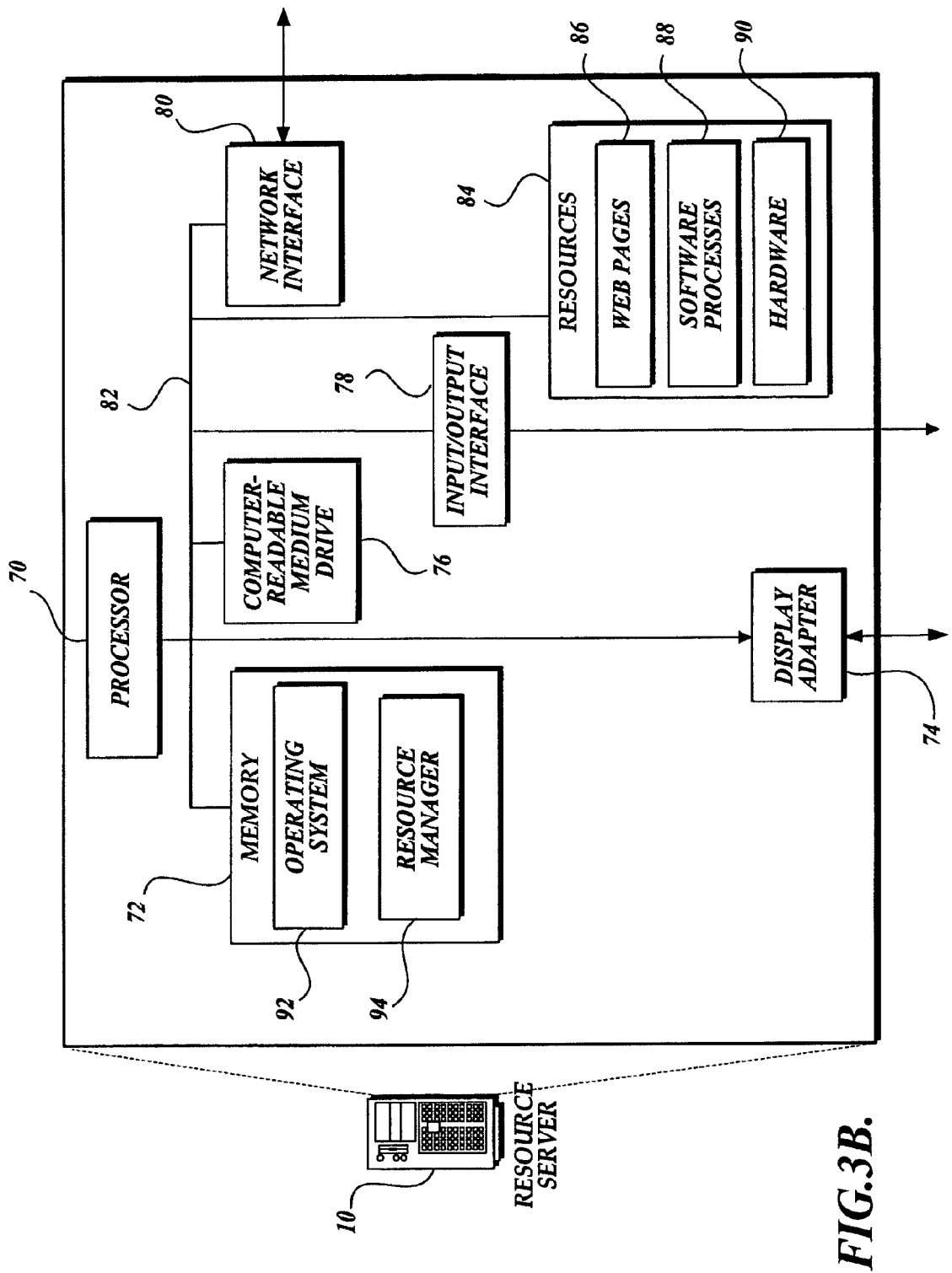
FIG. 3B is a block diagram showing some of the components that may be incorporated in a resource server as depicted in FIG. 1.
Figure 3C:
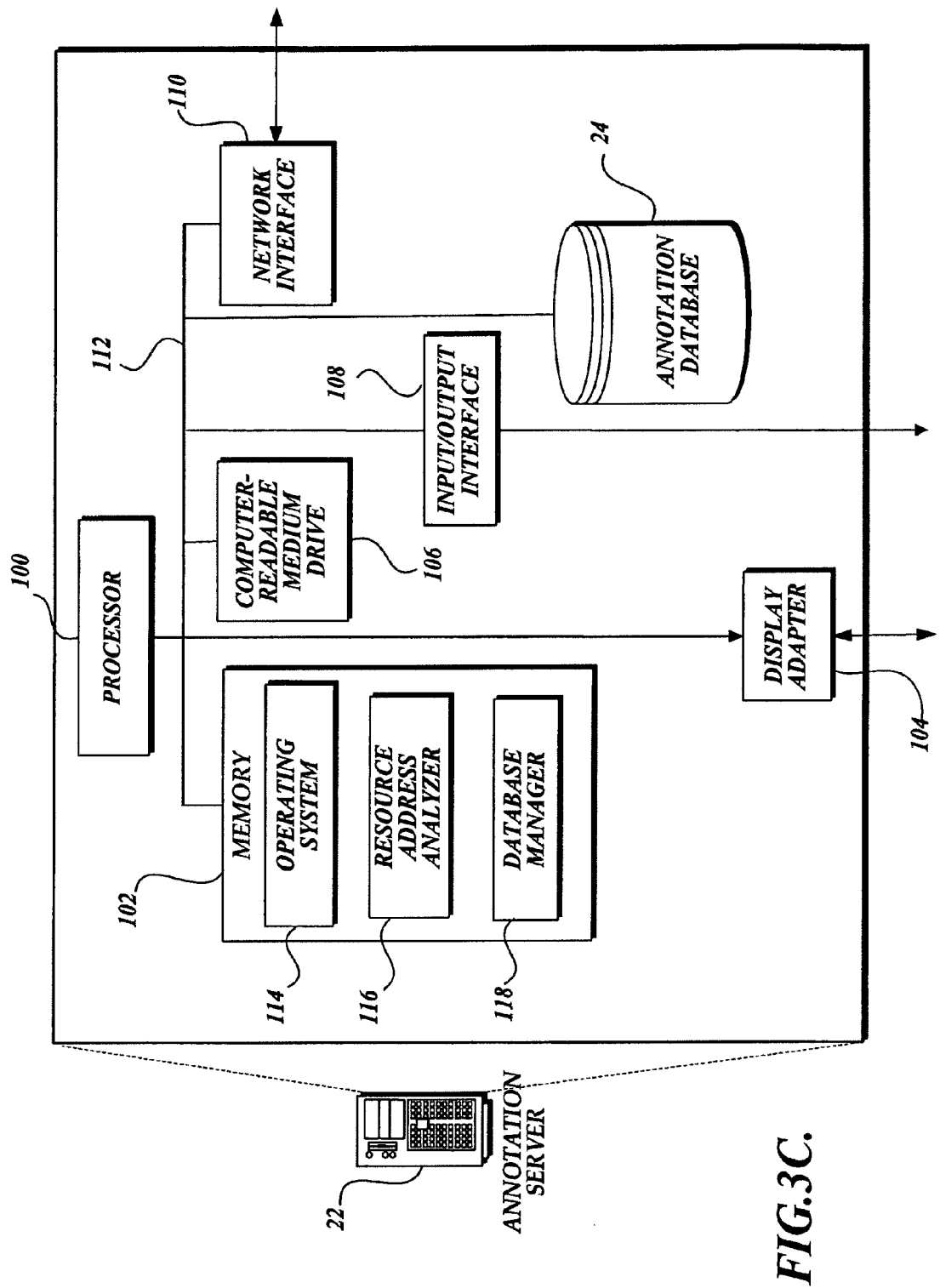
FIG. 3C is a block diagram showing some of the components that may be incorporated in an annotation server as depicted in FIG. 1.

Turning now to FIGS. 3A-3C, exemplary computer architectures for the resource server 10, client system 12 shown in FIG. 1, and annotation server 22 are described. FIG. 3A depicts an exemplary computer architecture for a client system, such as the client system 12, suitable for use in implementing one or more embodiments of the invention. Of course, those skilled in computers will appreciate that the client system 12, as well as the resource server 10 and annotation server 22 described below, may include greater or fewer components than those shown in FIGS. 3A-3C.

The client system 12 shown in FIG. 3A is connected to the network 16 (FIG. 1) using a network interface 60. The network interface 60 includes the necessary hardware and software to allow the client system 12 to communicate with other computing devices connected to the network 16 using one or more suitable communication protocols, such as TCP/IP.

The client system 12 in FIG. 2 includes a processor 50, a memory 52, a video display adapter 54, a computer-readable medium drive 56 (e.g., disk drive), and an input/output interface 58, all communicatively connected together and to the network interface 60 by a communication bus 62. The memory 52 generally comprises RAM, ROM, and/or permanent memory. The memory 52 stores an operating system 64 for controlling the general operation of the client system 12.

The operating system 64 may be a general-purpose operating system such as a Microsoft® operating system, UNIX®, or Linux® operating system.

The memory 52 additionally stores program code and data for providing a resource application 66 that allows users to request and receive resources via the network interface 60. One possible embodiment of a resource application 66 is a Web browser software package that, when executed by the processor 50, displays configurable markup documents, such as the sample Web pages shown in FIG. 4A through FIG. 8. The resource application 66, however, is not limited to Web browsers, and may be any application that can access and use a computer resource.

Also stored in the memory 52 is an annotation interface 68. The annotation interface 68 comprises computer-executable instructions that, when executed by the processor 50, provide a tool for the user to input annotations, as well as display prior annotations to the user. Examples of an annotation interface 68 in the form of a toolbar is depicted and described herein, though the annotation interface 68 is not limited to a toolbar implementation. The annotation interface 68 may be provided by a wholly separate application executing on the client system 12, it may be provided by a software process hosted and operated by the annotation server 22 or other computing device, or it may be integrated into another application, such as a toolbar that is added to an existing browser application. The annotation interface 68 in this example may communicate with an annotation server 22 (FIG. 3C) via the network interface 60.

The video display adapter 54 provides display signals to a local display (not shown in FIG. 3A) permitting a user 18 to observe and interact with the client system 12. The input/output interface 58 likewise communicates with external devices not shown in FIG. 2, such as a mouse, keyboard, scanner, pen, or other input device that can be operated by the user 18.

FIG. 3B depicts an exemplary computer architecture for a resource server, such as the resource server 10 shown in FIG. 1. A resource server 10 is not necessary to practice the invention, but may be provided for delivering one or more requested resources to a user. The resource server 10 may be operated by the same entity that operates the annotation server 22 (depicted in FIG. 3C) or may be operated by an unrelated third party. The functions of the resource server 10 and the annotation server 22 may even be provided by the same computing system.

The exemplary resource server 10 shown in FIG. 3B includes many components that may operate in a manner similar to those components described above in FIG. 3A with respect to the client system 12. The resource server 10 may include a processor 70 in communication with a memory 72, a display adapter 74, a computer-readable medium drive 76, an input/output interface 78, and a network interface 80, all communicatively connected by a bus 82. The memory 72, as shown, stores an operating system 92 that controls the general operation of the resource server 10.

The memory 72 additionally stores program code and data for providing a resource manager 94 that interacts with one or more resources 84. As depicted in FIG. 3B, the resources 84 may include such items as Web pages 86, software processes 88, and/or hardware devices 90, that are addressable by a network address. In response to receiving a request for a resource identified by a network address, the resource manager 94 directs one or more of the resources 84 to be delivered to the user (e.g., via the network interface 80).

FIG. 3C depicts an exemplary computer architecture for an annotation server, such as the annotation server 22 shown in FIG. 1, suitable for use in implementing one or more embodiments of the invention. As with the client system 12 and resource server 10, the annotation server 22 has a network interface 110 that includes the necessary hardware and software to allow the annotation server 22 to communicate with other computing devices connected to the network 16. Furthermore, the annotation server 22 includes several components that may operate in a manner as described above, including a processor 100, a memory 102, a display adapter 104, a computer-readable medium drive 106 and an input/output interface 108, all communicatively connected to each other and to the network interface 110 by a communication bus 112.

The memory 102 includes an operating system 114 that, when executed by the processor 100, controls the general operation of the annotation server 22. Further included in the memory 102 is program code and data that, when executed by the processor 100, provide a resource address analyzer 116 and a database manager 118.

When a network address is received by the annotation server 22 in connection with a user, the resource address analyzer 116 operates on the network address to identify the network domain of the resource, as described earlier in block 34 of FIG. 2. The resource address analyzer 116 communicates the network domain to the database manager 118. The database manager 118 uses the network domain to query the annotation database 24 to determine whether the user has previously stored an annotation in association with the network domain of the resource. The annotation database 24 may be physically housed within the annotation server 22 as shown in FIG. 3C, or may be located remotely from the annotation server 22, as shown in FIG. 1. When remotely located, the annotation database 24 may communicate with the annotation server 22 by a direct communication link as depicted in FIG. 1, or by network communication.

The annotation database 24 may be comprised of a large capacity storage device that contains data structures suitable for storing annotations in association with a user identity and the network address of a resource. The data structures in the annotation database 24 may be organized in any suitable fashion, including the form of a table.

If the database manager 118 determines from the annotation database 24 that the user has previously stored an annotation in association with the received network address, the database manager 118 retrieves the annotation from the database 24 and communicates it to the client system 12 via the network interface 110. The retrieved annotation may then be displayed to the user in an annotation interface at the client system 12.

Figure 4A:
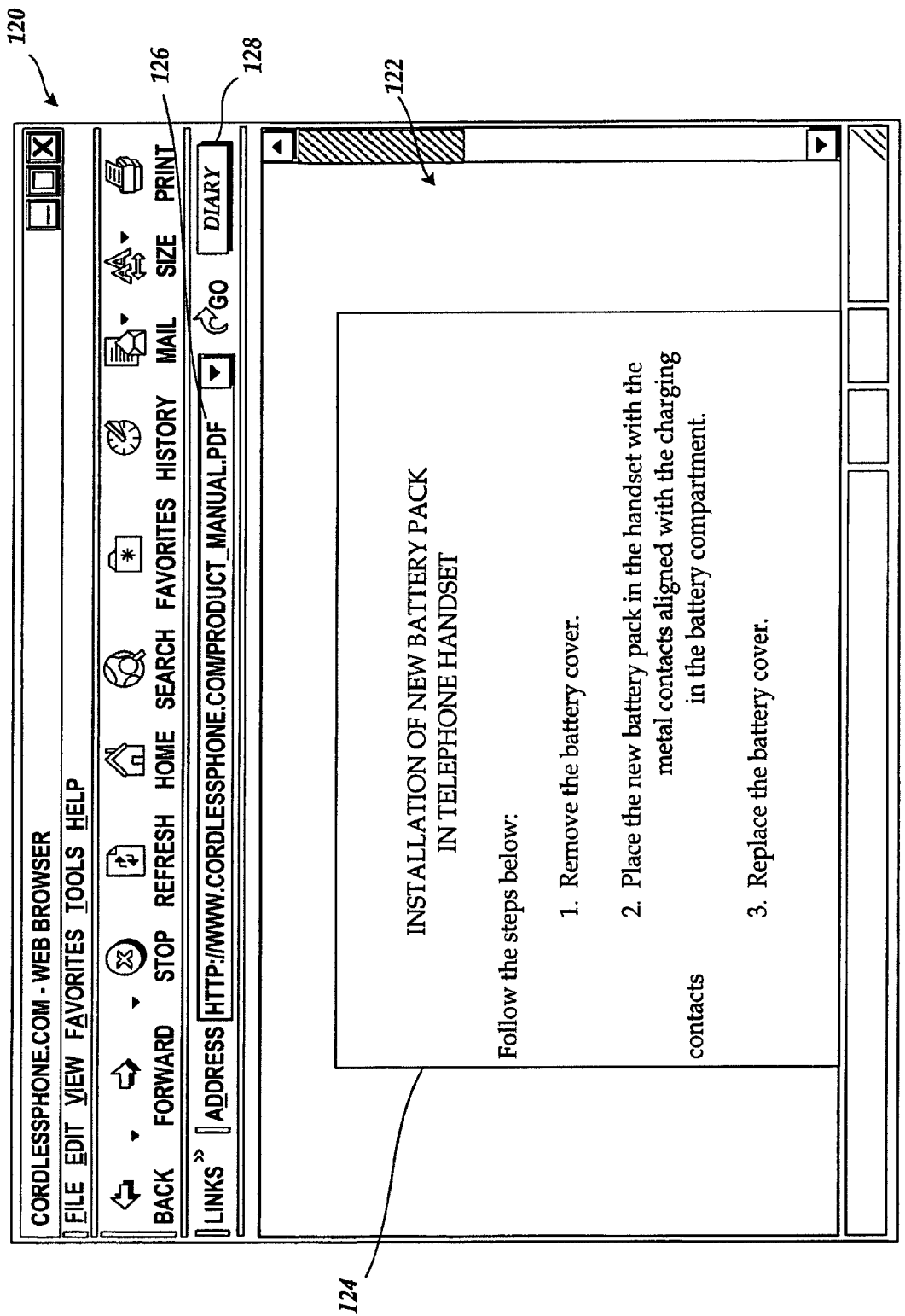
FIG. 4A is a display diagram showing a typical Web browser having an annotation toolbar with a control operable by a user to reveal an annotation field of the toolbar.
Figure 4B:
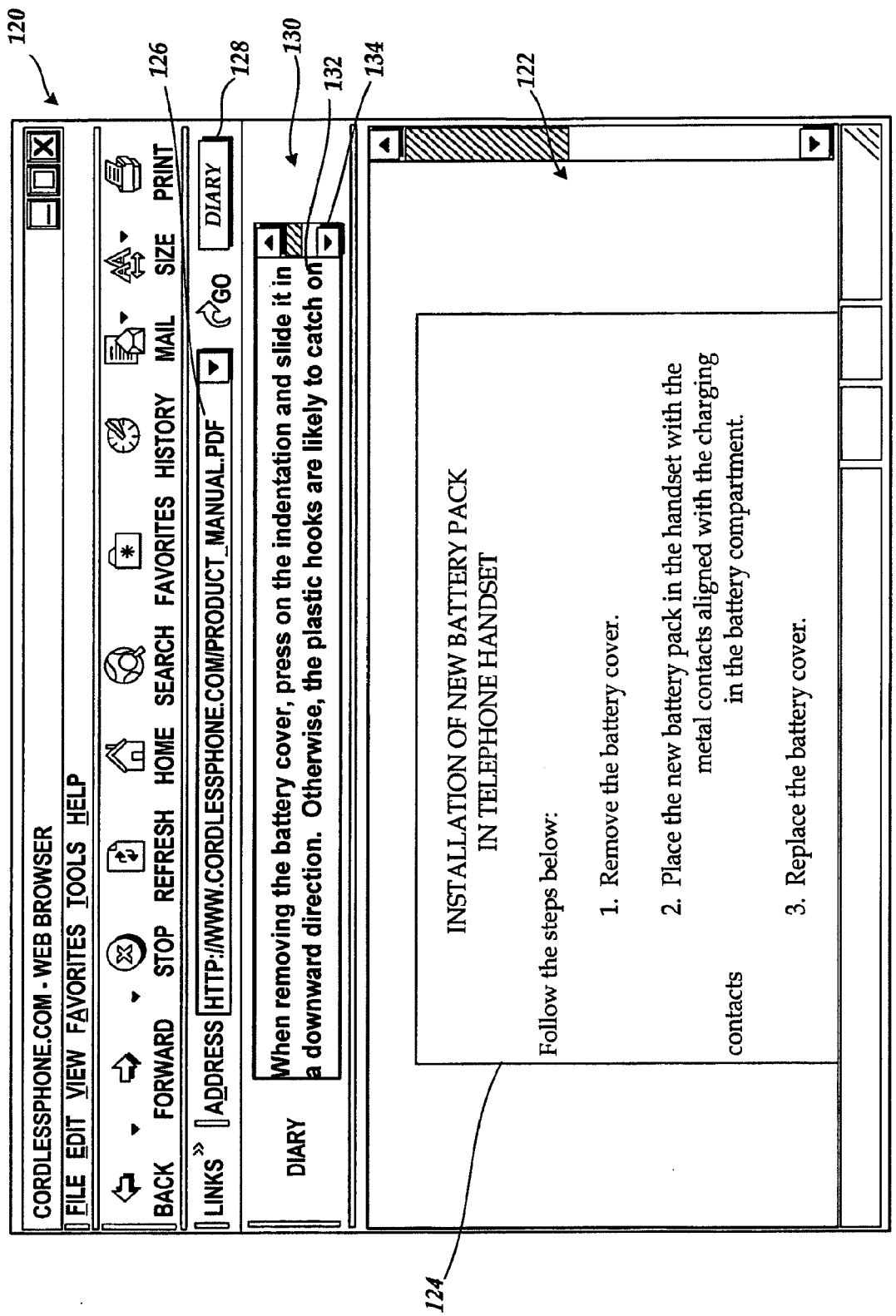
FIG. 4B is a display diagram showing the Web browser depicted in FIG. 4A wherein the user has operated the control and revealed the annotation field of the toolbar.

Described next in connection with FIGS. 4A and 4B is a specific example of a resource application 66 (FIG. 3A) in the form of a Web browser 120. Integrated with the Web browser 120 is an annotation interface 68 (FIG. 3A) in the form of a toolbar 130 (FIG. 4B).

In FIG. 4A, the Web browser 120 includes a display area 122 for providing a resource, such as a Web browser, document, or software process. Specifically, the Web page 120 in FIG. 4A features a sample product manual document 124 in PDF format.

The product manual is identified by a network address in the form of a URL as shown in the address block 126. When a user enters the URL into the Web browser 120, the Web browser requests the particular resource (here, the product manual) from a server (here, one or more resource servers identified by "www.cordlessphone.com").

The Web browser 120 further includes a control 128 that a user may operate to reveal an annotation interface having an annotation field for displaying and receiving annotations from the user. The control 128 may be a button labeled "Diary" as shown, or any other form of control, such as a hypertext link, check box, etc.

When the user activates the control 128, an annotation interface 130 as shown in FIG. 4B is revealed to the user. In one suitable embodiment, the annotation interface 130 is a toolbar that is incorporated into an Internet Explorer® browser from Microsoft Corporation by developing a "COM" component implementing the interfaces IobjectWithSiteImp1, InputObject, and IdeskBand, and registering the component with the operating system, as described in greater detail by "Programming and Reusing the Browser", available at http://msdn.microsofl.com/library/default.asp?urlqworkshop/browser/progr_browser_node_e ntry.asp, which is incorporated herein by reference. See also "Reusing Internet Explorer and the WebBrowser Control: An Array of Options" provided at http://msdn.microsoft.com/library/default.asp?url=/library/en-us/dnwebgen/html/reusebovw.asp, incorporated herein by reference.

In some embodiments, controls may be displayed within the context of the Web page that is currently displayed in the browser. In other embodiments, controls may be displayed outside the browser window, such as in a separate window, on the desktop, or in the desktop taskbar. In yet other embodiments, visible controls are not displayed, but the user is permitted to use other forms of computer input, such as typing a key or a key combination, or by speaking a voice command, to activate the control.

In any event, activating the control 128 causes the annotation interface 130 to appear. The annotation interface 130 includes an annotation field 132. When the annotation is larger than the space provided by the annotation field 132, the annotation field 132 may further include a scroll bar control 134 that allows the user to scroll through the annotation.

Initially, before the user has annotated the resource being provided, the annotation field 132 may be blank. As the user has thoughts, opinions, or information in regard to the resource, the user may enter an annotation in the annotation field 132. The annotation interface 130 may be configured to receive annotations in the form of text and/or graphics (e.g., an image or handwritten input, for example, as entered into a Tablet PC). The annotation interface 130 may also be configured to receive an annotation that includes a link that identifies another resource on the computer network. Annotations entered into the annotation interface 130 are stored in association with the user and the network address of the resource being provided.

Figure 5:
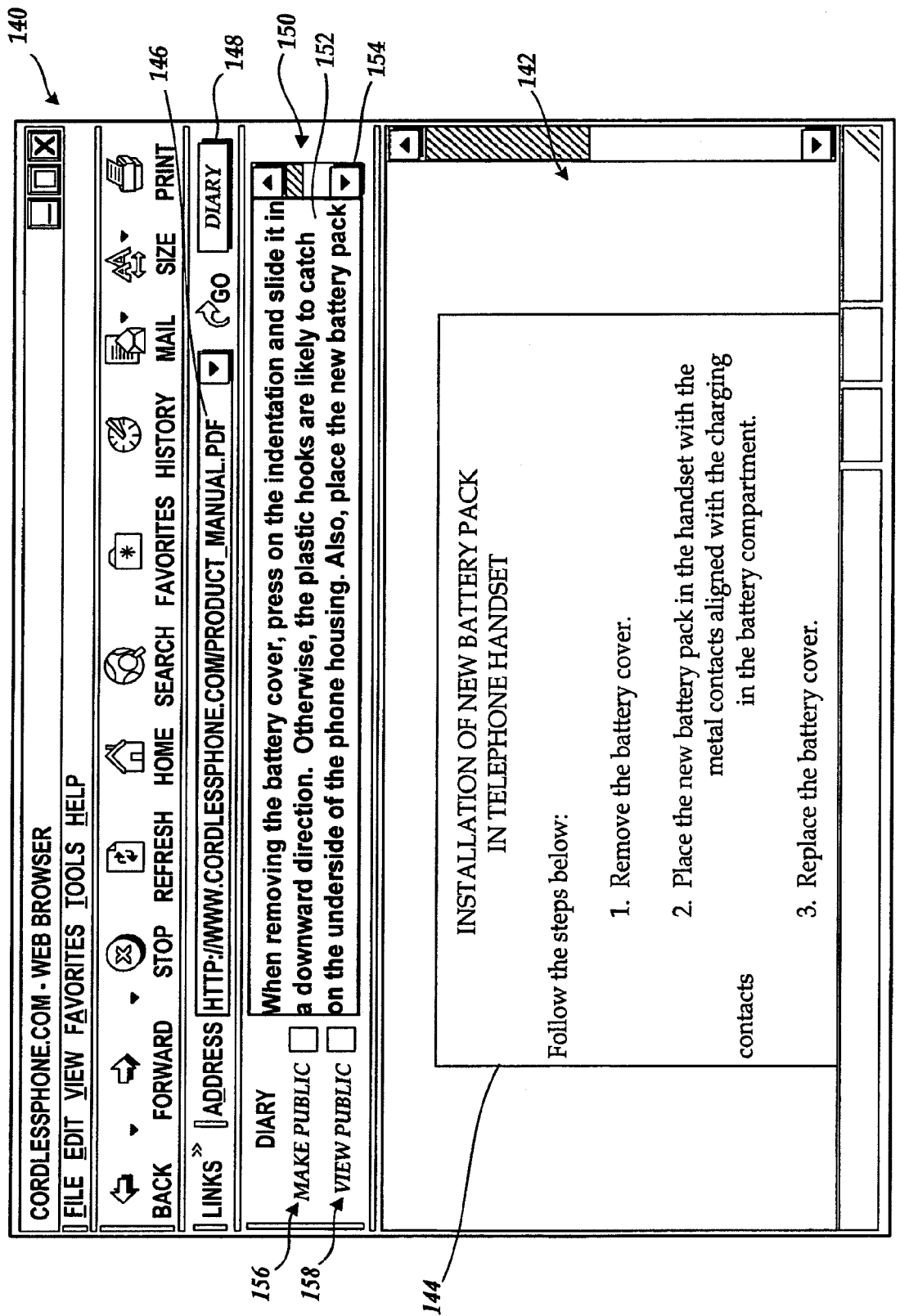
FIG. 5 is a display diagram showing a typical Web browser having an annotation toolbar with an annotation field, in which the display size of the toolbar is adjusted based on the size of the annotation in the annotation field, and also showing controls operable by a user to make an annotation available to the public or view public annotations by others.

FIG. 5 illustrates a Web browser 140 that includes several aspects similar to those described above in the Web browser 120. The Web browser 140 includes a display area 142 that, in this example, displays a document 144. The document 144 is identified in the network by the URL in the address field 146. Activation of a control 148 has caused an annotation interface 150 to appear to the user.

The annotation interface 150 is shown in the form of a toolbar similar to the annotation interface 130 described above, but with some differences. In particular, the annotation field 134 in this case includes three lines of text, as opposed to two lines. The annotation interface 150 also includes a control 156 that the user may activate to allow others to receive and view the user's annotation in the annotation field 152. Another control 158, when activated by the user, causes annotations written and made public by others to be viewable by the user. Similar to the annotation field 132, the annotation field 152 includes a scroll bar 154 that the user may operate to view annotations that are larger than the annotation field 152.

The display size of the annotation interface 150 may be fixed at a predetermined size and provide an annotation field with a defined number of lines. Alternatively, the display size of the annotation interface may be dynamic such that the size is adjusted according to the size of annotation in the annotation field. For example, if a user's annotation fits on one line, the display size of the annotation interface 150 may be adjusted to show only one line in the annotation field 152. If the user's annotation occupies two or three lines, the display size of the annotation interface 150 may be adjusted accordingly to display two or three lines in the annotation field 152. A maximum display size of the annotation interface 150 (e.g., three lines, in this example), may be defined if desired. If the size of the annotation in the annotation field 152 exceeds the display size of the annotation interface 150, a scroll bar control 154 is provided.

Figure 6:
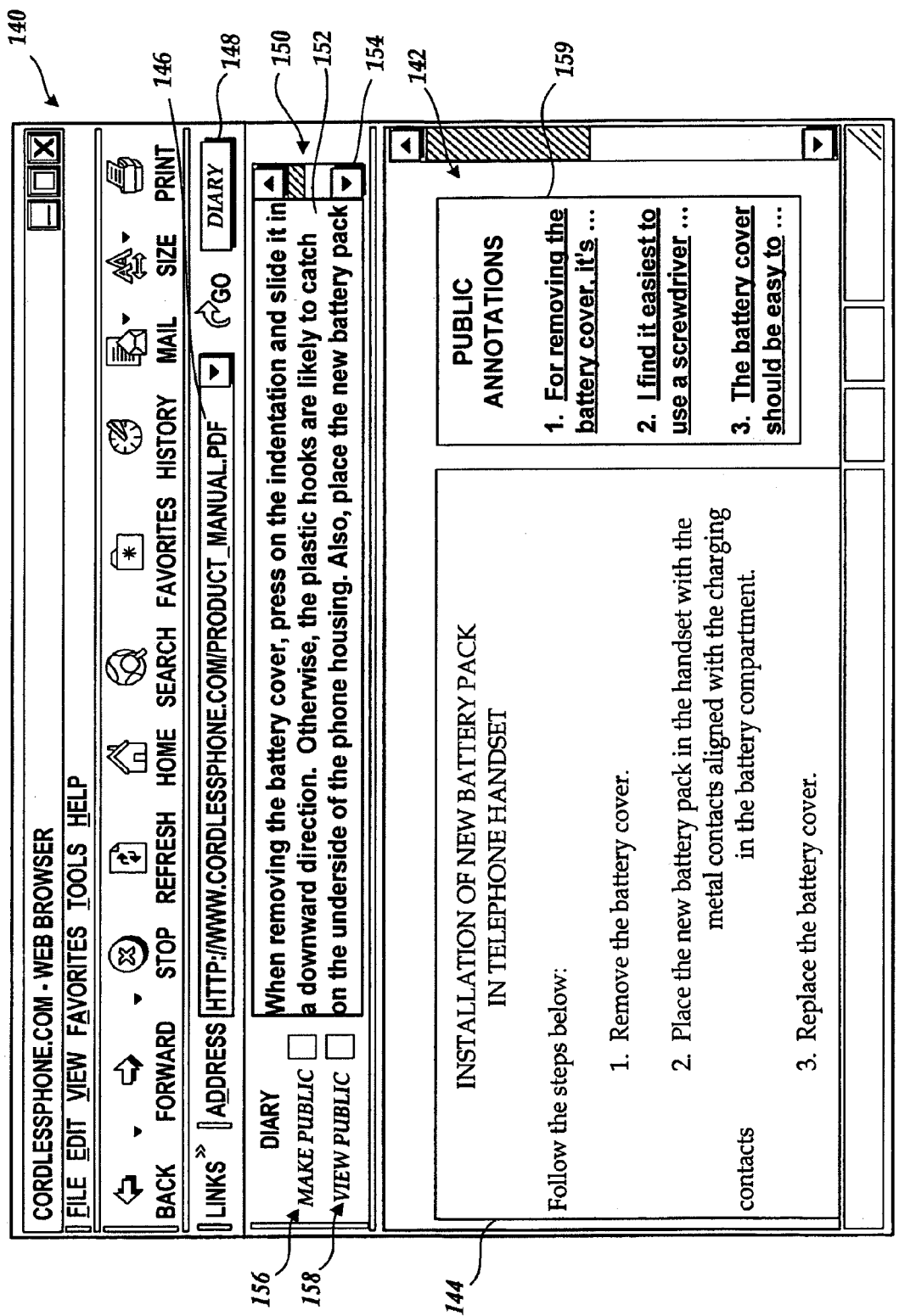
FIG. 6 is a display diagram showing the Web browser depicted in FIG. 5 wherein a user has activated the controls to make the annotation public and receive public annotations from others.

FIG. 6 shows the Web browser 140 depicted in FIG. 5 wherein a user has activated the controls 156 and 158 described above. When the user activates the "Make Public" control 156 (here, in the form of a checkbox), the Web browser 140 sends a command to the annotation server 22 indicating that the annotation displayed in the annotation field 152 (and possibly stored in the annotation database 24) may be distributed to other users, preferably those users who have indicated an interest in receiving annotations from others. In a similar fashion, activation of the "View Public" control 158 causes the Web browser 140 to send a command to the annotation server 22 indicating that the user desires to view annotations relating to the resource as received and made public by other users. The annotation server 22 queries the annotation database 24 with the network address of the resource to find those annotations associated with the resource and made public by the originating users. In the example of FIG. 6, activation of the control 158 causes the display area 142 to include a window, frame, or other portion 159 for displaying the public annotations. Where there are many public annotations, the display portion 159 may include the first few words of each annotation and provide a hypertext link or other control that the user may activate to view the entirety of an annotation.

Figure 7:
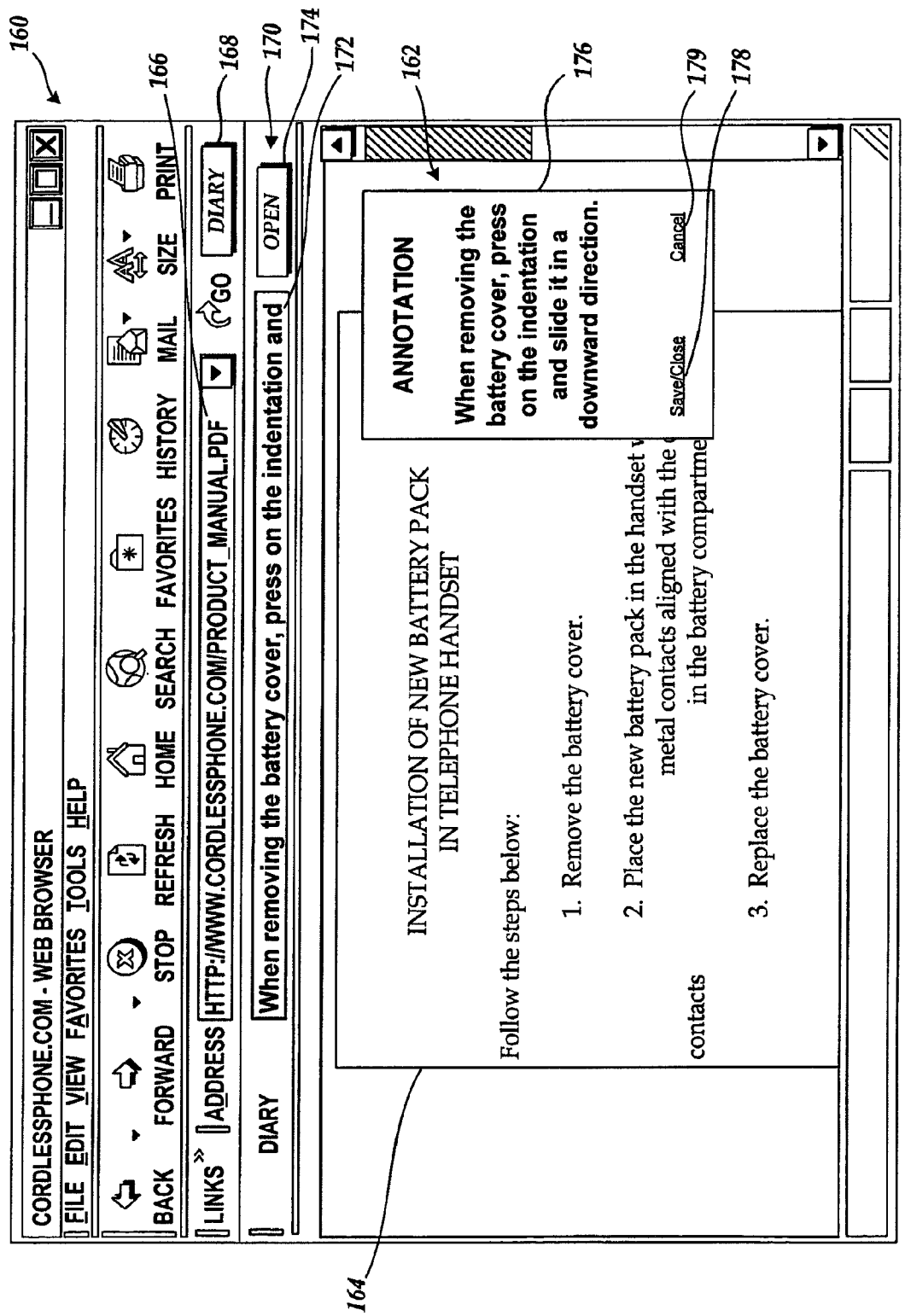
FIG. 7 is a display diagram showing a typical Web browser having an annotation toolbar with an annotation field and a control that has been operated by a user to open a new annotation field separate from the toolbar for displaying an annotation to the user.

FIG. 7 illustrates yet another embodiment of the invention in which a Web browser 160 has a display area 162 showing a document 164. The network address of the document is shown in the address field 166. As with embodiments previously described, the Web browser 160 includes a control 168 that, when activated by the user, reveals an annotation interface 170. The annotation interface 170, in this case, has a fixed size of one line and includes an annotation field 172.

Further included in the annotation interface 170 is a control 174 that, when activated by the user, opens a new annotation field separate from the toolbar for displaying the annotation to the user. In this illustration, the new annotation field is a separate window 176 displayed over the top of the document 164. In other embodiments, the control 174, when activated, may act to simply expand the annotation field 172 appearing in the annotation interface 170.

Preferably the new annotation field 176 is configured to receive annotations from the user in addition to displaying annotations to the user. Furthermore, annotations displayed in the new annotation field 176 may be modified, as desired, by the user.

The new annotation field 176 depicted in FIG. 7 includes further controls 178 and 179 in the form of hypertext links labeled "Save/Close" and "Cancel", respectively. User activation of the control 178 by the user causes the Web browser 160 to transmit a command to the annotation server 22 to store the annotation presently displayed in the new annotation field 176 in the annotation database 24. As earlier described, the annotation is stored in association with the user and the network address of the resource. The control 178 further closes the new annotation field 176, thus enabling the user to view the resource shown in the display area 162.

The control 179, when activated by the user, causes the Web browser 160 to simply close the new annotation field 176 without having the annotation displayed therein stored by the annotation server 22.

Figure 8:
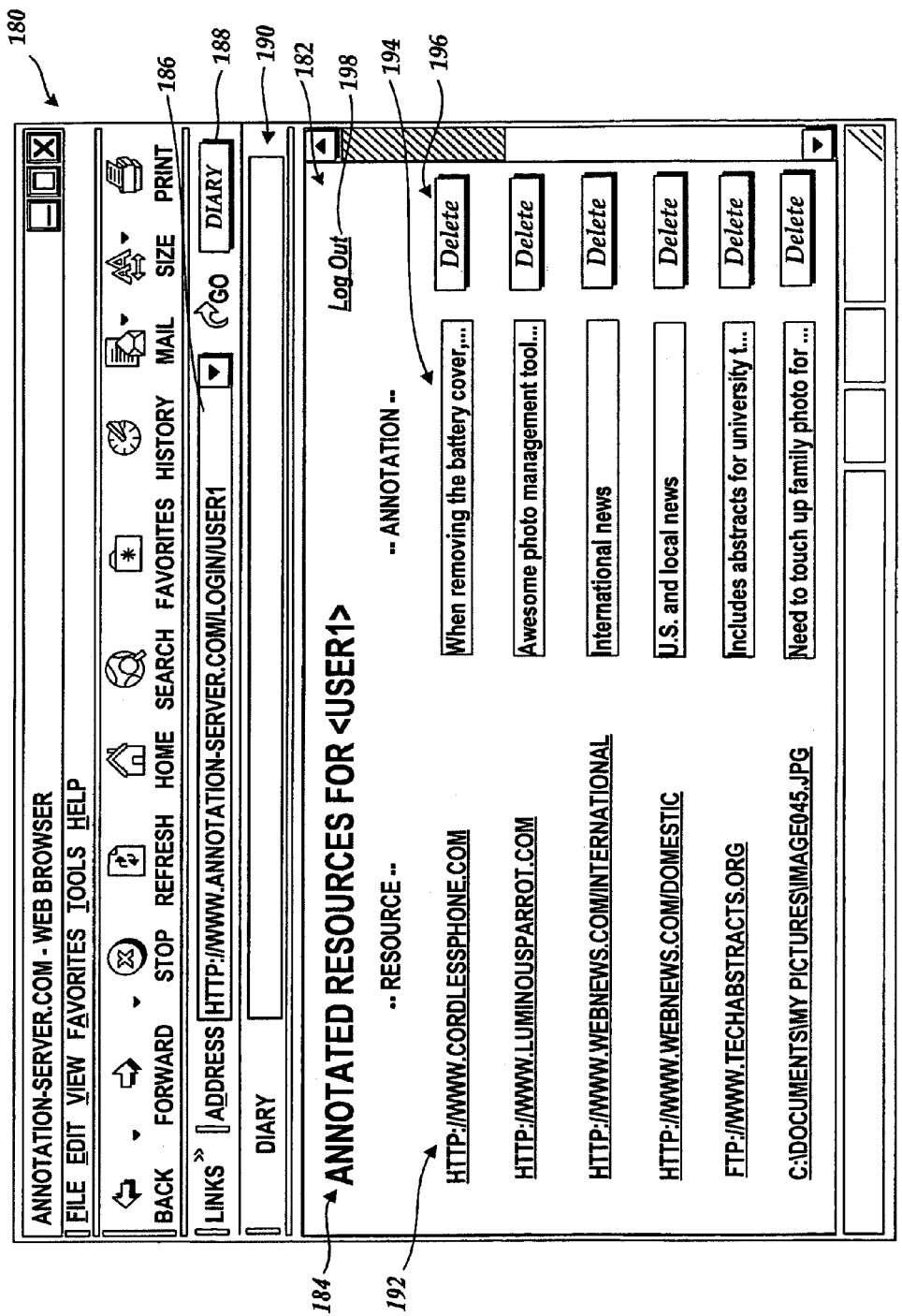
FIG. 8 is a display diagram showing a typical Web browser in which a report is displayed to the user showing the resources and annotations associated therewith currently stored in association with the user.

Because annotations are stored in association with a user's identity, the annotation server 22 may generate one or more reports for the user that describe the resources and annotations stored by the user in regard to the resources. FIG. 8, for example, shows a typical Web browser in which a report is displayed to the user listing the resources and annotations associated therewith currently stored in association with the user. The Web browser 180 includes a display area 182 that includes an "annotated resources" report 184 for the user. Since annotations are typically personal to the user, the annotation server 22 preferably provides a login routine by which the user may securely enter the annotation server 22 and access his or her account. The network address of the user's account, after login, is shown in the address field 186. As with earlier described embodiments, the Web browser 180 also includes a control 188 that reveals an annotation interface 190 to the user.

The annotated resources report 184 includes information identifying the resources 192 and annotations 194 received from the user. In the example shown, each of the resources 192 has an annotation 194 appearing adjacent thereto. Preferably, the annotations are provided to the user in a field that accepts modifications from the user. The annotation server 22 may store any modifications entered by the user at the time the user is editing the report. Alternatively, the modifications, if any, may be stored when the user navigates away from the report or otherwise closes the Web browser 180. Additional controls 196 are provided to permit the user to delete one or more annotations or resources from the annotated resources report 184. Lastly, a logout link 198 is provided to permit the user to affirmatively logout of the annotation server 22.

As will be appreciated from the foregoing, in some embodiments the annotation interface may be integrated into or otherwise communicate with the user's resource application 66 (e.g., Web browser) to automatically detect when the user is requesting a resource with a network address. For example, where an annotation interface is provided in the form of a toolbar or browser extension to the Internet Explorer® browser from Microsoft Corporation, the browser extension can be configured to recognize when a network address is entered into the browser for purposes of navigating to a resource. Such functionality in a browser extension is further described in "Web Accessories" available at http://msdn.microsoft.com/workshop/browser/accessory/overview/overview.asp, which is incorporated herein by reference.

Embodiments of the invention may also be provided in the form of a computer-readable medium whose contents cause a computing system to undertake actions as described above. For example, a computer-readable medium may be inserted into the computer-readable medium drive 106 as shown in FIG. 3C to cause the annotation server 22 to receive a network address for a resource on a computer network, receive an annotation from a user in association with the resource, and store the annotation in association with the user and the network address of the resource in an annotation database 24, without requiring a separate action from the user to store the annotation. The computer-readable medium may be further configured with contents causing the computing system to perform other actions described above, such as retrieving annotations from the annotation database 24 and providing reports to users of the information stored in the annotation database 24.

As should be understood from the foregoing, an annotation may be stored in association with a portion or all of the address identifying the resource to which the annotation pertains. In some embodiments where a user's annotation is stored with the full address of the resource, computer processes may analyze the resource address and parse out various levels or portions of the address, especially where a network domain or file hierarchy is concerned, when storing the annotation. With resource addresses parsed in that manner, a user may request and obtain an annotated resources report (see, e.g., FIG. 8) that aggregates annotations at any desired level. For example, in reference to FIG. 8, a user requesting to see all annotations associated with "www.webnews.com" would cause the annotation database to return the two annotations having "www.webnews.com" at the network domain level (thus effectively ignoring the sublevel designations "/international" and "/domestic"). Further parsing can be performed to remove extraneous information such as reference tags or session identifiers that are specific to the instance in which the resource is provided, prior to storing an annotation.

Annotations may further be stored in association with one or more categories. For example, resources such as merchant Web sites may be associated with a "shopping sites" category, news resources may be associated with a "news sites" category, photograph resources may be associated with a "photographs" category, etc. Subcategories may also be defined as desired. An annotation interface 68 as described above may include a control, such as a button or drop down box that lists categories which the user can select to designate a category for the annotation currently in the annotation interface. The user may change the category designation at any time, or choose to have no category designation at all. Storing annotations in association with categories may allow the user to request and obtain an annotated resources report (e.g., FIG. 8) listing only those annotations in categories (or subcategories) of interest. In some embodiments, the category of an annotation may be stored in the annotation database as metadata with the annotation.

Unlike metadata stored directly with a resource (such as document creation data in a word processing document), embodiments of the invention may allow a user to privately annotate a resource on a local computing system (e.g., "image045.jpg" in FIG. 8) and then share the resource with someone else without sharing the annotation. In embodiments where the user's annotations are stored in an annotation server connected to a network, the user may also access annotations for local resources from remote computing systems, even though the actual resource (on the local computing system) is not available on the remote computing system.

As noted above, a user's annotations are stored in association with the user's identity. It should be understood that a "user" in this regard may include individual or groups of people, computing processes or devices. For example, the annotation interface 68 referenced in FIG. 3A may have an assigned identifier that is unique in the annotation database 24 (FIG. 3C). The annotation interface 68 may transmit this unique identifier to the annotation server 22 when sending an annotation and associated resource address to the annotation server 22 for storage. In circumstances such as this, the "user" is the annotation interface 68 which may be operated by multiple individuals.

In other circumstances, a "user" may be an individual person. For example, the annotation interface 68 may be configured to allow a person to "log in" or otherwise identify himself or herself to the annotation interface. Thereafter, annotations submitted to the annotation server 22 by the annotation interface 68 may include the person's identity. Different persons may thus use the same annotation interface 68, but by logging in or otherwise identifying themselves, they may have their annotations stored separately under the correct user identity.

Combinations of the foregoing may also be used. For example, an annotation interface 68 having a unique identifier may identify the current "user", or person, to the annotation server 22 when the person "logs in" to the annotation interface 68. The annotation server 22 may note the user identity with the unique identifier of the annotation interface 68. Thereafter, annotations received from the annotation interface 68 (identified by the unique identifier) are stored by the annotation server 22 in association 30 with the currently-identified user of the annotation interface 68, until the user "logs out" or a different user "logs in" to the annotation interface 68.

In other embodiments, the annotation interface 68 may be configured with a control, such as a button or drop down box that lists users which a person may select to designate the current user of the annotation interface 68. Depending on the particular embodiment, formal log in and log out procedures that require authentication may not be necessary.

Furthermore, an individual person may define different profiles that the person could use to submit annotations using the annotation interface 68. For example, a person could have a "business" profile set up for annotating resources while at work, and a "personal" profile for annotating resources while at home. Embodiments of the invention may consider each of these profiles as a different "user". Easy-to-use controls in the annotation interface 68, such as a button or drop down box, may be provided as described above to allow the person to select the current profile with which annotations should be associated. Preferably, the annotation interface 68 enables the person to easily switch profiles as desired when annotating different resources.

Alternatively, instead of defining different profiles as different "users", other embodiments of the invention may allow a user to define different roles or locations for annotations, similar to defining categories as discussed above. For example, the user could designate a "work" role or location while annotating at work, and a "home" role or location when annotating at home. The user need not log in or out of these roles, but with appropriate controls in the annotation interface, the user can easily switch between these roles. The particular role associated with an annotation may be stored as metadata with the annotation.

While several embodiments of the invention have been illustrated and described above, it will be appreciated that various changes can be made therein without departing from the spirit and scope of the invention. The scope of the invention, therefore, should be determined from the following claims and equivalents thereto.

The invention claimed is:

1. A non-transitory computer-readable medium having instructions stored thereon that, responsive to being executed by a client device, cause the client device to perform operations comprising:

rendering an interface for a resource application of a client device that includes a display area configured to present a resource;

presenting the resource in the display area;

exposing an annotation portion in the interface that is configured to enable input of annotations for the presented resource in accordance with a location setting of the client device associated with a user profile, the presented resource unmodified by the annotations,
wherein the user profile is one of at least two user profiles associated with a user of the client device, and
wherein each of the at least two user profiles is associated with a different location of the client device;
receiving an annotation input via the annotation portion; and
communicating with an annotation server, separate from the client device, to store the annotation for the presented resource at predetermined times in response to the receiving the annotation.

2. The non-transitory computer-readable medium of claim 1, wherein the communicating comprises communicating according to a scheduled interval.

3. The non-transitory computer-readable medium of claim 1, wherein the communicating comprises communicating upon modification of the annotation.

4. The non-transitory computer-readable medium of claim 1, wherein the communicating comprises communicating upon receiving the annotation via the annotation portion.

5. The non-transitory computer-readable medium of claim 1, wherein the communicating at predetermined times includes communicating upon termination of the presenting the resource by the resource application.

6. The non-transitory computer readable medium of claim 1, having further instructions stored thereon that, responsive to being executed by the client device, cause the client device to perform operations comprising:
requesting the resource from a provider using a network address;
concurrently communicating the network address and an identifier to the annotation server to retrieve annotations corresponding to the resource; and
outputting the retrieved annotations in the annotation portion in conjunction with the presenting the resource in the display area.

7. The non-transitory computer readable medium of claim 1, having further instructions stored thereon that, responsive to being executed by the client device, cause the client device to perform operations comprising:
communicating an identifier to the annotation server;
obtaining an annotation stored by the annotation server, separate from the client device, in association with the identifier; and
presenting the annotation associated with the identifier via the annotation portion.

8. The non-transitory computer readable medium of claim 1, having further instructions stored thereon that, responsive to being executed by the client device, cause the client device to perform operations comprising:
detecting navigation of the resource application to obtain another resource; and
in response to the detecting, independent of an affirmative user selection, further communicating with the annotation server to store the received annotation.

9. A computer implemented method comprising:
rendering an interface for a resource application of a client device that includes a display area configured to present a resource;
presenting the resource in the display area;
exposing an annotation portion in the interface that is configured to enable input of annotations for the presented resource in accordance with a location setting of the client device associated with a user profile, the presented resource unmodified by the annotations,
wherein the user profile is one of at least two user profiles associated with a user of the client device, and
wherein each of the at least two user profiles is associated with a different location of the client device;
receiving an annotation input via the annotation portion; and
communicating with an annotation server to store the annotation for the presented resource at predetermined times in response to the receiving the annotation.

10. The computer implemented method of claim 9, wherein the communicating comprises communicating according to a scheduled interval.

11. The computer implemented method of claim 9, wherein the communicating comprises communicating in response to at least one of: modification of the annotation and receiving the annotation via the annotation portion.

12. The computer implemented method of claim 9, wherein the communicating at predetermined times includes communicating upon termination of the presenting the resource by the resource application.

13. The computer implemented method of claim 9, further comprising:
requesting the resource from a provider using a network address;
concurrently communicating the network address and an identifier to the annotation server to retrieve annotations corresponding to the resource; and
outputting the retrieved annotations in the annotation portion in conjunction with the presenting the resource in the display area.

14. The computer implemented method of claim 9, further comprising:
communicating an identifier to the annotation server;
obtaining an annotation stored by the annotation server in association with the identifier; and
presenting the annotation associated with the identifier via the annotation portion.

15. The computer implemented method of claim 9, further comprising:
detecting navigation of the resource application to obtain another resource; and
in response to the detecting and independent of an affirmative user selection, communicating with the annotation server to store the received annotation.

16. The non-transitory computer readable medium of claim 1, wherein the annotation portion in the interface comprises an area separate from the display area configured to present the resource.

17. The non-transitory computer readable medium of claim 6, wherein the annotation portion comprises a separate window displayed over the presented resource.

18. The non-transitory computer readable medium of claim 1, having further instructions stored thereon that, responsive to being executed by the client device, cause the client device to perform operations comprising:
modifying the interface to include a toolbar separate from the display area configured to present the resource, the toolbar comprising the annotation portion.

19. The non-transitory computer readable medium of claim 1, having further instructions stored thereon that, responsive to being executed by the client device, cause the client device to perform operations comprising:

setting the user profile based on a location of the client device.

\* \* \* \* \*